United States Patent [19]

Takagi et al.

[11] 4,073,594
[45] Feb. 14, 1978

[54] PUMP STARTING METHOD FOR HYDRAULIC MACHINERY

[75] Inventors: Nobuho Takagi, Hitachi; Mituo Takase, Mito; Takashi Itoh, Ibaraki; Katsumi Seno; Toshihiko Koseki, both of Hitachi, all of Japan

[73] Assignee: Hitachi, Ltd., Japan

[21] Appl. No.: 692,995

[22] Filed: June 4, 1976

[30] Foreign Application Priority Data

June 11, 1975 Japan .................................. 50-69626

[51] Int. Cl.² .............................................. F01D 17/00
[52] U.S. Cl. ........................................................ 415/1
[58] Field of Search ............................................. 415/1

[56] References Cited

U.S. PATENT DOCUMENTS

| | | | |
|---|---|---|---|
| 3,030,070 | 4/1962 | Krauss | 415/1 |
| 3,264,485 | 8/1966 | Naganuma et al. | 415/1 |
| 3,309,057 | 3/1967 | Tonooka | 415/1 |
| 3,403,888 | 10/1968 | Hartland | 415/1 |
| 3,658,436 | 4/1972 | Oishi et al. | 415/1 |
| 3,945,754 | 3/1976 | Hagiya et al. | 415/1 |
| 3,960,463 | 6/1976 | Okada et al. | 415/1 |

Primary Examiner—C. J. Husar
Attorney, Agent, or Firm—Craig & Antonelli

[57] ABSTRACT

A pump starting method for hydraulic machinery such as a pump turbine and a pump having adjustable guide vanes and an inlet valve, by which hydraulic vibrations due to pump no discharge operation can be prevented by beginning pumping-up with said adjustable guide vanes being opened before a main valve included in a said inlet valve is fully opened in starting the pump.

8 Claims, 6 Drawing Figures

PUMP STARTING METHOD FOR HYDRAULIC MACHINERY

This invention relates to a pump starting method for hydraulic machinery such as a pump turbine and a pump.

In general, in the case of pump starting for hydraulic machinery such as a pump turbine and a pump having adjustable guide vanes a main valve, by pass valve and downstream seal compressed air is fed to a runner chamber, water in the runner chamber is pushed down into a tail-race, the runner is started in air, and a generator-motor or a motor is brought into parallel operation with an electric power net work. Thereafter, air is discharged from the runner chamber to the outside, thus resulting in the generating of a discharge pressure in the runner. This pressure reaches a predetermined value to thereby begin to open a bypass valve. When said bypass valve is fully open, a downstream seal begins to open. When the downstream seal is fully opened, a main valve begins to open. Further, the adjustable guide vanes begin to open on condition that the main valve is fully opened, thereby beginning pumping-up. This conventional method has been adopted for machinery having a relatively high head. However, according to one example, it takes about two minutes from the establishing of the discharge pressure of runner to the beginning of opening of the adjustable guide vane. Said period of two minutes is referred to as pump no discharge operation, by which the runner is caused to be rotated in the water at flow rate 0. As the result, hydraulic vibrations are high, thus greatly affecting the service life of the machine and components. Additionally, in order to achieve improved operation efficiency, it is desirable to shorten pumping-up starting time as much as possible. This shortening of no discharge operation which necessarily leads to improved service life will greatly enhance the value in performance.

One object of the present invention is to provide a pump starting method of high efficiency and low vibations by obviating the problems accompanying with the aforesaid pump no discharge operation.

Additionally, another object of the present invention is to achieve effects in efficient operation of a hydroelectric power plant by a method by which the time of pump no discharge operation is shortened to 40 to 50 sec as against approx. 100 to 150 sec according to the prior art, to thereby shorten the operation time of high hydraulic vibrations. As a result the service life of the machine and components are extended to more than 2 to 3 times, and the whole period of time for pump starting is shortened, thereby enabling to pump up through receiving surplus electric power for a short period of time.

The present invention contemplates to improve a pump starting method for hydraulic machinery having adjustable guide vanes main valve, by-pass valve and downstream seal, by which hydraulic vibrations due to pump no discharge operation is prevented by beginning pumping-up with said adjustable guide vanes being opened after the main valve is fully opened as according to the conventional method but before a main valve is fully opened.

Figure 1:
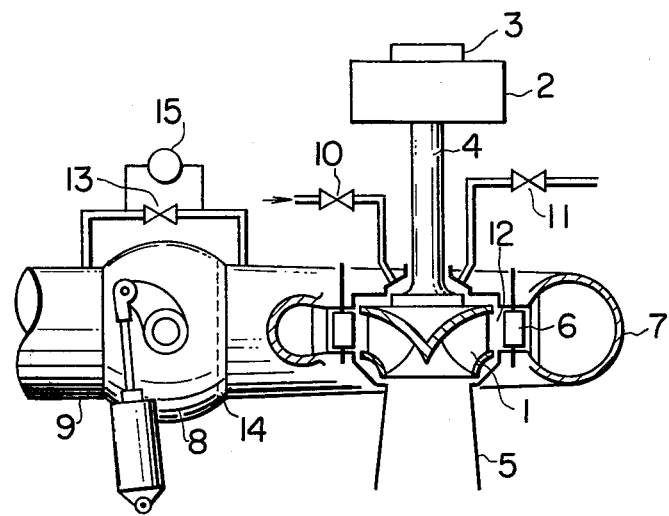
FIG. 1 and FIG. 2 are a side view and a plan view showing an ordinary hydraulic machinery, respectively.
Figure 2:
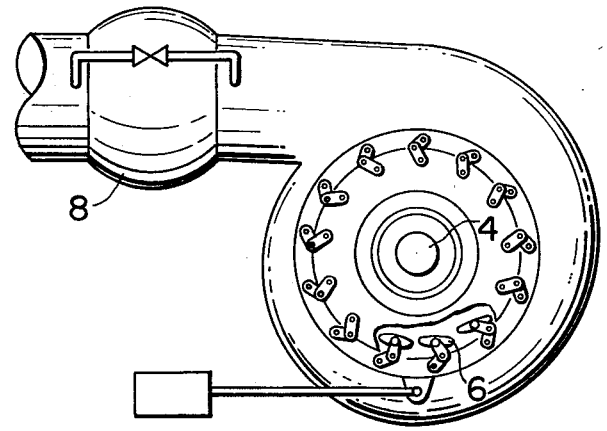

A runner 1 of the hydraulic machinery shown in FIG. 1 and FIG. 2 is connected to a generator-motor 2 and a starting motor 3 by means of a main shaft 4. In the case of pumping operation, water flows from a lower reservoir (not shown) through a draft tube 5, is energized by the runner 1, regulated in its flow rate by adjustable guide vanes 6, and thereafter led into an upper reservoir (not shown) through a casing 7, a main valve 8 and a penstock 9.

In order to start pump in the pump-turbine or pump described above, an air supply valve 10 is opened with a main valve 8 and adjustable guide vanes 6 being fully closed, compressed air is fed to the runner chamber, and the water in the runner chamber is pushed down to a predetermined water level when the air supply valve 10 is closed. The runner 1 is started in the direction of pumping rotation by the starting motor 3 in the condition where said runner is exposed in the air, and after the rotation speed is increased up to a rated value, the generator-motor 2 is brought into parallel operation with an electric power net work.

Figure 3:
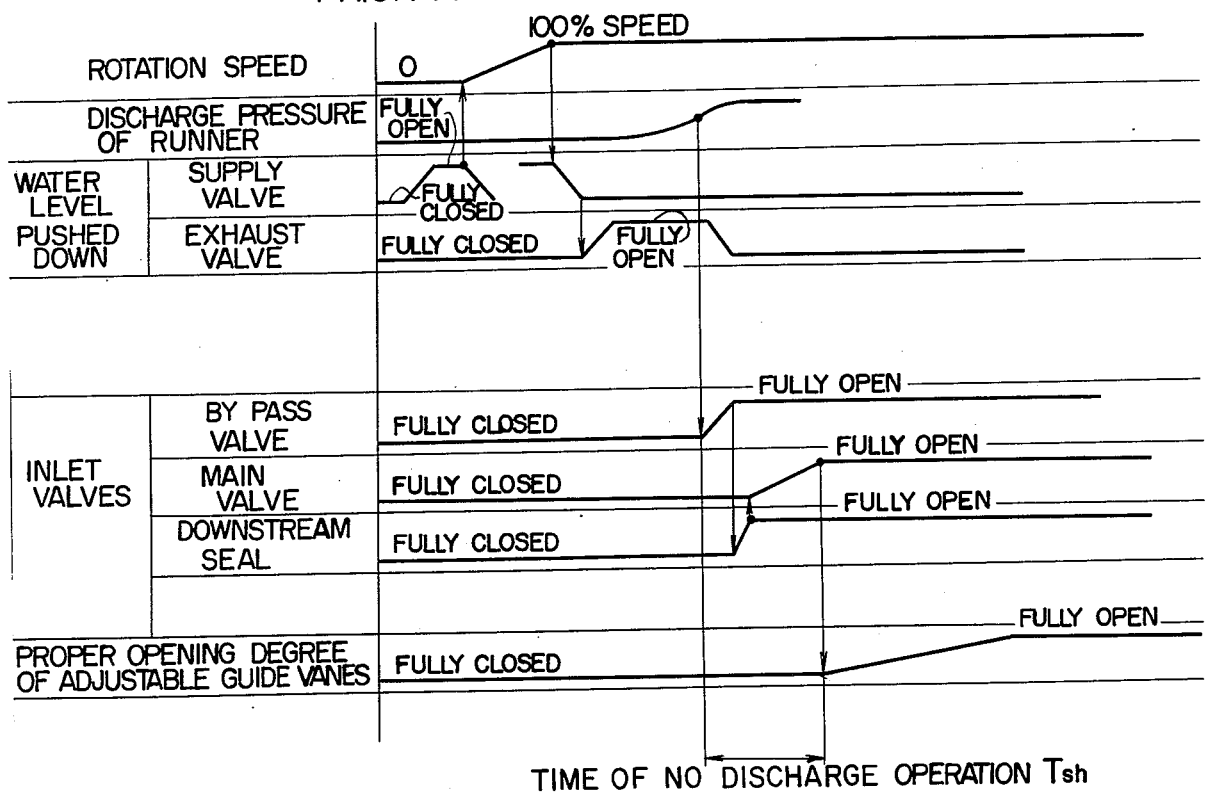
FIG. 3 is a chart showing the pump starting method according to the prior art.
Figure 5:
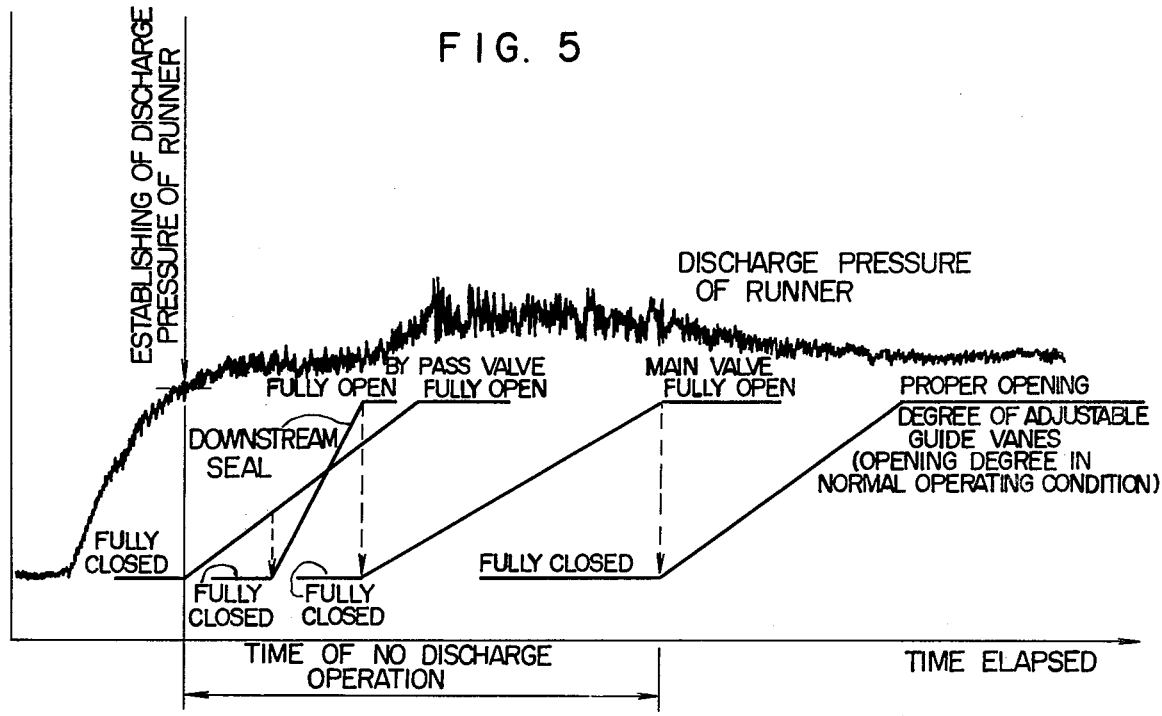
FIG. 5 is a chart showing hydraulic vibrations in the condition of pump no discharge operation and also conditions of the components. (Prior art)

After the generator motor brought into parallel operation with the electric power net work, the air in the runner chamber is discharged by opening an air exhaust valve 11. As a result, the water level is elevated to reach the runner, and the pressure in the discharge portion 12 of runner gradually becomes higher through the pumping-up of the runner. After said discharge pressure of the runner reaches to a pressure sufficient for pumping-up (which is referred to as the establishing of the discharge pressure of runner), an inlet valve (which consists of a by-pass valve 13, a downstream seal 14 and the main valve 8) and the adjustable guide vanes 6 are opened, and then pumping operation is effected. An example of the conventional time sequence in this pump starting is shown in FIG. 3. In FIG. 3, the time (Tsh) from the establishing of the discharge pressure of runner to the beginning of opening of the adjustable guide vanes 6 is referred to as pump no discharge operation. As shown in FIG. 5, the condition of pump no discharge operaion is accompanied with large hydraulic vibrations being about five times that of the normal operating condition, induces vibrations of rotatable and static parts, whereby the service life of various parts are greatly reduced and the resulting noise causes a problem.

The present invention contemplates to shorten the time of said pump no discharge operation (Tsh), thereby resulting in increased service life of the machine and components, and reduced noise.

The reason why said respective valves begin opening the succeeding control valves on condition that the formers are fully opened, as apparent from FIG. 3, is that it has been believed in general that the most preferable condition is brought about at the time when all of the actions included in one stroke are completed, and the detecting of conditions after the completion of one stroke is easy and reliable from the viewpoint of effecting control.

Therefore, the aforesaid drawbacks have been presented to bring about such operating conditions that the service life of the machine and components is reduced.

In view of the above, as for this sort of control, there has been a tendency that such a control method is studied that, before the respective strokes are completed, the respective succeeding strokes are begun, and before the completion of the control stroke of a succeeding stage, the control stroke of a preceding stage is completed (The condition of the completion of the stroke of the peceding stage is completed). For instance, published in Japanese Patent Publication No. 20338/68 is one example. In this publication, for example, the relationship in the opening degree between a main valve and adjustable guide vanes is self-controlled while said main valve and adjustable guide vanes are opened, and the control itself is extremely complicated. This is done to fit for the purpose. However, if the characteristics in opening and closing of the respective valves are grasped in advance, then the relationship in the opening degree should not necessarily be controlled (or regulated) during the course of the opening actions. To summarize, if the condition where the purpose can be achieved is completed, then it is is quite natural that the control should be further simplified.

Figure 4:
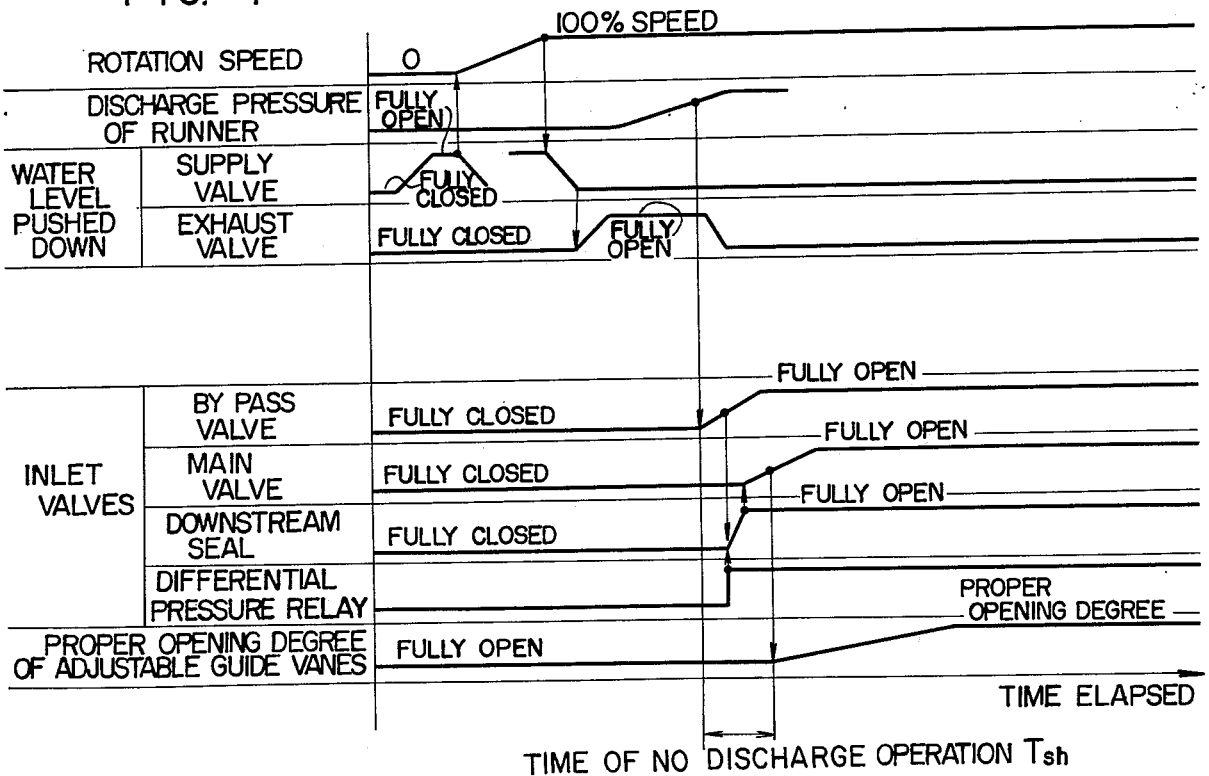
FIG. 4 and FIG. 6 are charts showing the pump starting method according to the present invention, respectively.

In one example of control method according to the present invention shown in FIG. 4, the by-pass valve begins to open at the establishing of the discharge pressure of runner, the downstream seal is opened upon the by-pass valve reaching a desired, predetermined opening degree (including the full closing) or upon the differential pressure between the pressures in front and in the rear of the main valve reaching a desired, predetermined value of pressure which may be detected by a pressure differential relay 15, and the main valve starts to open once the downstream seal is fully opened. Further, the adjustable guide vanes start opening when the main valve reaches a desired, predetermined opening degree (including the full closing but excluding the full opening), so that pumping-up is begun.

It is possible to shorten the time of pump no discharge operation and also the total period of time required for pump starting by adopting the sequence described above, and consequently a great advantage is presented for the operation of a hydro-electro power plant, for example.

The discharge pressure of runner described above does not mean the pressure capable of pumping up a predetermined quantity of water, but does means, for example, a previously calculated pressure regarded as one going to grow up to be a pressure capable of pumping up water at least at the time when the adjustable guide vanes 6 are opened in the final stroke. The relationship in the opening degree between the by pass valve, the main valve and the adjustable guide vanes is predetermined so that the stroke of the preceding stage can be completed before or at the same time with the completion of the succeeding stage. With this arrangement, the differential pressure between the pressures in front and in the rear of the main valve in the penstock can be easily predetermined by previously studying the opening rates (of the main valve and the by pass valve), for example.

Figure 6:
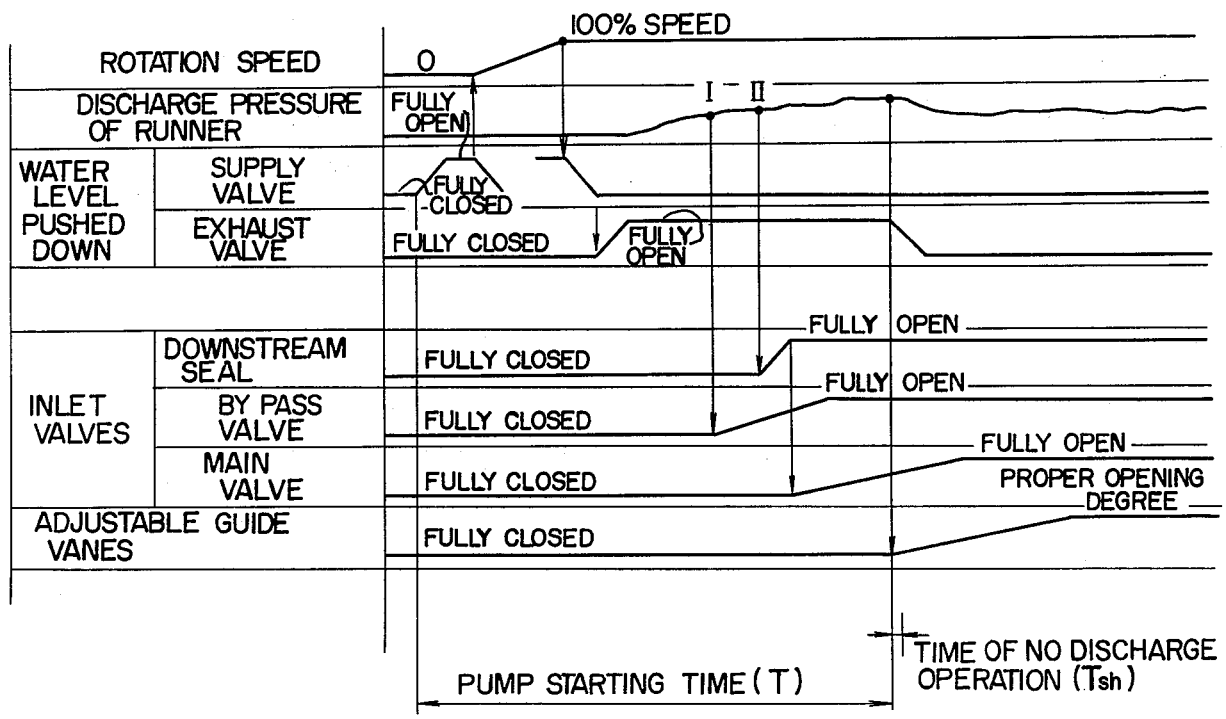

Shown in FIG. 6 is an example where the respective components are adapted to be controlled (actuated to open) separately of one another in accordance with the change (growth) of the discharge pressure of runner. In the example shown in FIG. 6, the components included in the inlet valves (i.e. downstream seal, by-pass valve, and main valve) and the adjustable guide vanes are adapted to be actuated to open by three pressure detectors which are part of a pressure differential relay 15, and are triggered when the discharge pressure reaches the points indicated at I to III.

More particularly, the by pass valve included in the inlet valve is begun to open by the establishing of first stage pressure I of the runner discharge I. Even in the course of opening of the by pass valve, the seal included in the inlet valve is begun to open by the establishing of the second stage pressure (II) of the runner discharge. The main valve begins to open on condition that said seal on the downstream side is fully opened. Even in the course of opening of said main valve, the adjustable guide vanes begin to open at the time when the discharge pressure of runner reaches to the value of pressure sufficient to effect pumping-up and the third stage pressure (III) of the runner discharge is established, thereby beginning pumping operation.

What is claimed is:

1. A pump starting method for hydraulic machinery wherein a runner is brought into no discharge operation in water at flow rate 0 in pump starting, said method comprising the steps of:

a main valve included in an inlet valve to the hydraulic machinery disposed on the side of an upper reservoir upstream of said hydraulic machinery being opened when the discharge pressure of the runner reaches a predetermined value; and adjustable guide vanes being opened to begin pumping-up while said main valve moves to be fully opened.

2. A pump starting method for hydraulic machinery comprised of a penstock communicating between an upper and a lower reservoir and adjustable guide vanes, and an inlet valve to the machinery provided at the intermediate portion of the penstock, said inlet valve including a downstream seal portion, and a by-pass valve and a main valve both provided on the side of an upper reservoir upstream of said hydraulic machinery, wherein said method comprises the steps of:

said by-pass valve being opened when the rotation speed of the runner of the hydraulic machinery is increased to the rated speed and the discharge pressure of runner reaches a predetermined valve;

the downstream seal included in the inlet valve being released when a differential pressure in front and in the rear of the main valve caused by opening of the by-pass valve reaches a predetermined differential pressure; and thereafter, the adjustable guide vanes being opened to begin pumping-up when the main valve reaches a predetermined opening degree less than full open.

3. A pump starting method of hydraulic machinery consisting of a penstock communicating between an upper and a lower reservoir and adjustable guide vanes and an inlet valve to the machinery provided at the intermediate portion of the penstock, said inlet valve including a downstream seal portion, and a by-pass valve and a main valve both provided on the side of an upper reservoir upstream of said hydraulic machinery, the steps wherein:

in starting the pump of said hydraulic machinery, said by-pass valve, downstream seal, main valve and adjustable guide vanes are actuated to open independently of one another by plural pressure detectors, thereby beginning pumping-up.

4. The pump starting method according to claim 3, wherein the step of opening said adjustable vanes is commenced prior to said main valve achieving a fully open position.

5. A pump starting method comprising the steps of:
with adjustable guide vanes being in a fully closed position, bringing a pump runner up to its operational speed;
establsihing a predetermined discharge pressure in the runner;
opening a by-pass valve when said predetermined pressure is established;
opening a seal downstream of said runner;
opening a main valve upon said seal reaching a fully open position;
starting to open said adjustable guide vanes after said main valve starts to open but prior to said main valve reaching a fully opened position.

6. The pump starting method according to claim 5, wherein the step of opening a seal downstream of said runner is commenced when said by-pass valve reaches a predetermined position.

7. The pump starting method according to claim 6, wherein the step of opening a seal downstream of said runner is commenced when the differential pressure between the front and rear of said main valve reaches a predetermined value.

8. The pump starting method according to claim 5, wherein the step of bringing said pump' runner up to operational speed is commenced after a compressed gas has been introduced into a runner chamber formed by said closed vanes and has depressed the water level in said runner chamber to a level below the runner, and said step of establishing a pedetermined discharge pressure being commenced by discharging said compressed gas from said chamber.

* * * * *